(12) United States Patent
Simone et al.

(10) Patent No.: US 7,971,685 B2
(45) Date of Patent: Jul. 5, 2011

(54) PUMP JACK TREE STAND

(76) Inventors: Anthony Simone, Webster, NY (US);
Frank Garcea, Churchville, NY (US)

( * ) Notice: Subject to any disclaimer, the term of this patent is extended or adjusted under 35 U.S.C. 154(b) by 686 days.

(21) Appl. No.: 11/670,222

(22) Filed: Feb. 1, 2007

(65) Prior Publication Data

US 2007/0175702 A1    Aug. 2, 2007

Related U.S. Application Data

(60) Provisional application No. 60/764,231, filed on Feb. 1, 2006.

(51) Int. Cl.
*A63B 27/00* (2006.01)

(52) U.S. Cl. ......... 182/133; 182/221; 182/187; 182/136

(58) Field of Classification Search .................. 182/133, 182/134, 135, 136, 221, 222, 223, 187
See application file for complete search history.

(56) References Cited

U.S. PATENT DOCUMENTS

| | | | | |
|---|---|---|---|---|
| 1,714,044 A | * | 5/1929 | Pedersen | 182/113 |
| 2,232,414 A | * | 2/1941 | Swann | 182/206 |
| 4,078,633 A | * | 3/1978 | Fahy | 182/82 |
| 4,273,215 A | * | 6/1981 | Leggett | 182/3 |
| 4,411,335 A | * | 10/1983 | Forrester | 182/83 |
| 4,432,435 A | * | 2/1984 | Anderson | 182/82 |
| 4,463,828 A | * | 8/1984 | Anderson | 182/136 |
| 4,469,195 A | * | 9/1984 | Sartain | 182/206 |
| 4,598,794 A | * | 7/1986 | Anderson | 182/113 |
| 4,624,342 A | * | 11/1986 | Anderson | 182/223 |
| 4,955,584 A | | 9/1990 | Anderson | |
| 5,042,615 A | * | 8/1991 | Anderson | 182/136 |
| 5,086,874 A | | 2/1992 | Treants | |
| 5,259,478 A | * | 11/1993 | Berish et al. | 182/136 |
| 5,307,899 A | * | 5/1994 | Lubinski | 182/136 |
| 5,316,104 A | * | 5/1994 | Amacker | 182/187 |
| 5,388,664 A | * | 2/1995 | Bator | 182/100 |
| 5,685,393 A | | 11/1997 | Early | |
| 5,692,582 A | * | 12/1997 | Lindemood | 182/133 |
| 5,927,440 A | * | 7/1999 | Freeman | 187/270 |
| 5,975,241 A | * | 11/1999 | Berish et al. | 182/136 |
| 6,015,028 A | * | 1/2000 | Smith | 182/136 |
| 6,045,442 A | * | 4/2000 | Bounds | 452/187 |
| 6,866,120 B1 | * | 3/2005 | Butterworth | 182/187 |
| 2007/0175702 A1 | * | 8/2007 | Simone | 182/187 |

OTHER PUBLICATIONS

Collins English Dictionary—Complete and Unabridged 6th Edition 2003. © William Collins Sons & Co. Ltd 1979, 1986 © HarperCollins Publishers 1991, 1994, 1998, 2000, 2003 for definition of "jack" as given and as can be viewed in the First office action.*
The American Heritage® Dictionary of the English Language, Fourth Edition copyright © 2000 by Houghton Mifflin Company. Updated in 2009. Published by Houghton Mifflin Company. All rights reserved. For definition of "pump" as given and as ca be viewed in the First office action.*

(Continued)

*Primary Examiner* — Katherine Mitchell
*Assistant Examiner* — Daniel Cahn
(74) *Attorney, Agent, or Firm* — Thomas R. FitzGerald, Esq.; Hiscock & Barclay, LLP (57) ABSTRACT

The invention comprises, in one form thereof, a pump jack tree stand including a platform and a seat engaging a pump jack. The pump jack cooperates with a pole that is supported by an adjacent tree. The user actuates a foot lever on the pump jack to climb the pole. The pump jack's release is hand actuated as opposed to the commonly used foot-actuated release.

21 Claims, 8 Drawing Sheets

OTHER PUBLICATIONS

Defintion of seat—see After Final for definition The American Heritage® Dictionary of the English Language, Fourth Edition copyright © 2000 by Houghton Mifflin Company. Updated in 2009. Published by Houghton Mifflin Company. All rights reserved.*

Definition of engage. See After Final for definition—Dictionary.com. Dictionary.com Unabridged. Random House, Inc. http://dictionary.reference.com/browse/engage (accessed: Sep. 24, 2010).*

* cited by examiner

PUMP JACK TREE STAND

CROSS-REFERENCE TO RELATED APPLICATIONS

This application claims priority from U.S. Provisional Patent Application Ser. No. 60/764,231, filed Feb. 1, 2006, the entirety of which is herein incorporated by reference.

FIELD OF THE INVENTION

This invention relates to tree stands for hunting purposes.

BACKGROUND OF THE INVENTION

When hunting deer, many hunters find it advantageous to wait in an elevated position to reduce the likelihood of being detected by an approaching deer. This is conventionally achieved by building a stand that is supported in or by a tree; however, such a structure requires a considerable amount of work. The tree stand is left in place so the hunter isn't required to rebuild every time he hunts. Theft and damage due to weather and vandalism is thus a concern. Hanging tree stands are commercially available and are generally constructed of robust metal. The hanging tree stand, which includes a frame, a platform, and a seat, is strapped to a tree at the desired height by a user who must climb a ladder to install the tree stand. The user also uses the ladder to get onto and off from the hanging tree stand. The hanging tree stand has a difficult setup and, if the user wishes to reduce damage due to weather, robbery, and vandalism, he must remove the hanging tree stand from the site. This requires the user to carry both the tree stand and a ladder to the site every time he wishes to hunt. Further, he must deal with the difficult setup and take-down every time.

U.S. Pat. No. 5,086,874 by Treants describes a tree climbing apparatus having a platform and an independent foot support. The climbing process is a two-step process wherein the user shifts her weight to the foot support and pulls up on a handle connected to the platform to raise the platform. The user then shifts her weight to the platform and lifts up her other leg to raise the foot support, which is strapped to her foot. Each of the platform and the foot support are secured to the tree by an adjustable cable and sprockets. Similarly, U.S. Pat. No. 5,692,582 to Lindemood describes a tree climber with a platform and a foot support that both engage the tree directly. The climbing process is, again, a two-step process. Both Treants and Lindemood describe apparatus that are attached directly to a tree and thus require the climbing components to be adjustable. Both references also require lifting of components with the user's arms in an undesirable two-step process; i.e., the user lifts one component and then another component. What is needed is a climbing apparatus that engages a pole of known dimensions with its moving parts, the pole engaging the unknown dimensions of the tree with stationary brackets. What is further needed is a climbing apparatus that utilizes an easier climbing process raising the apparatus as a single unit.

Even further, what is needed is a tree stand that is easy to get into and out of, allows repeat uses without requiring significant setup, does not leave expensive or difficult to replace materials at the site, and does not overburden the user with materials and equipment, such as a ladder, to carry to the site.

SUMMARY OF THE INVENTION

The invention comprises, in one form thereof a pump jack tree stand including a platform and a seat engaging a pump jack. The pump jack cooperates with a pole that is supported by an adjacent tree. The user actuates a lever on the pump jack to climb the pole. The pump jack's release is hand actuated as opposed to the commonly used foot-actuated release.

In one form, the pump jack tree stand includes a vertical support configured for engaging a grounded object; a pump jack for engaging the vertical support and operable to translate up and down the vertical support; and a platform coupled to the pump jack for traveling with the pump jack up and down the vertical support.

In another form, the invention includes a method of installing and using a pump jack tree stand. The method comprises the steps of installing a vertical support against a grounded object; assembling a pump jack onto the pole, the pump jack having a substantially horizontal platform attached thereto; and actuating a foot pedal pump arm on the pump jack to cause the pump jack to climb the pole.

The invention has the advantage of using a pole of known dimensions to engage the tree with stationary brackets. The climbing apparatus (the pump jack) engages the pole, thus the moving components may be simpler and have a lower probability of malfunction. Further, the pump jack is actuated to climb when the user actuates the foot lever. This allows the user to utilize his more powerful legs and his body weight to aid in climbing. The user is not required to lift components with his upper body during climbing. Further, the climbing apparatus climbs the pole as a unit; the user is not required to lift one component and then another component. Even further, the tree stand is easy to get into and out of, allows repeat uses without requiring significant setup, does not leave expensive or difficult to replace materials at the site, and does not overburden the user with materials and equipment, such as a ladder, to carry to the site.

BRIEF DESCRIPTION OF THE DRAWINGS

The present invention is disclosed with reference to the accompanying drawings, wherein.

Corresponding reference characters indicate corresponding parts throughout the several views. The examples set out herein illustrate several embodiments of the invention but should not be construed as limiting the scope of the invention in any manner.

DETAILED DESCRIPTION

Figure 1:
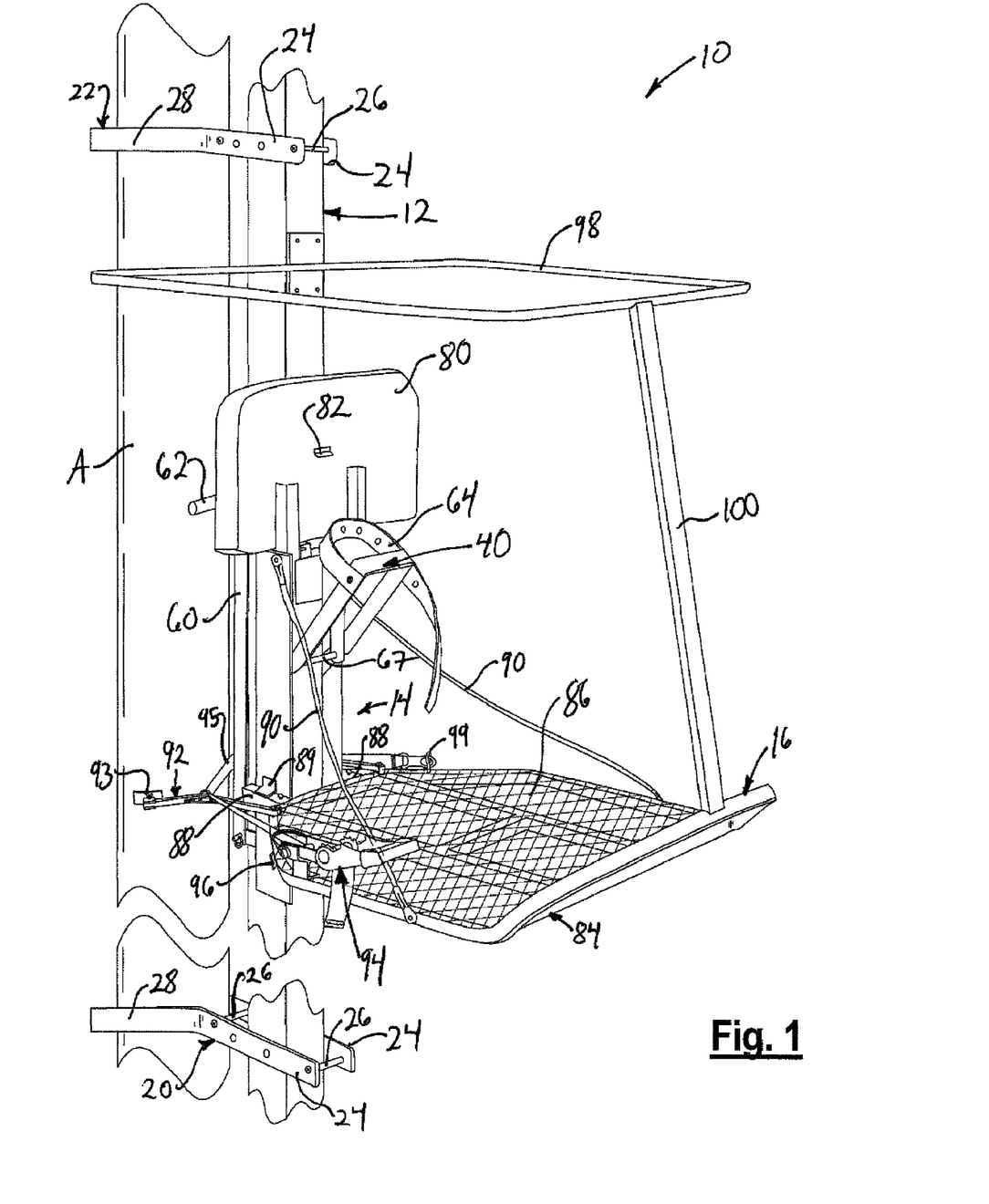
FIG. 1 is a perspective view of a pump jack tree stand of the present invention.

Referring to FIG. 1, there is shown the pump jack tree stand assembly of the present invention. The assembly 10 includes a pole 12, a pump jack 14, and a platform 16.

Figure 6:
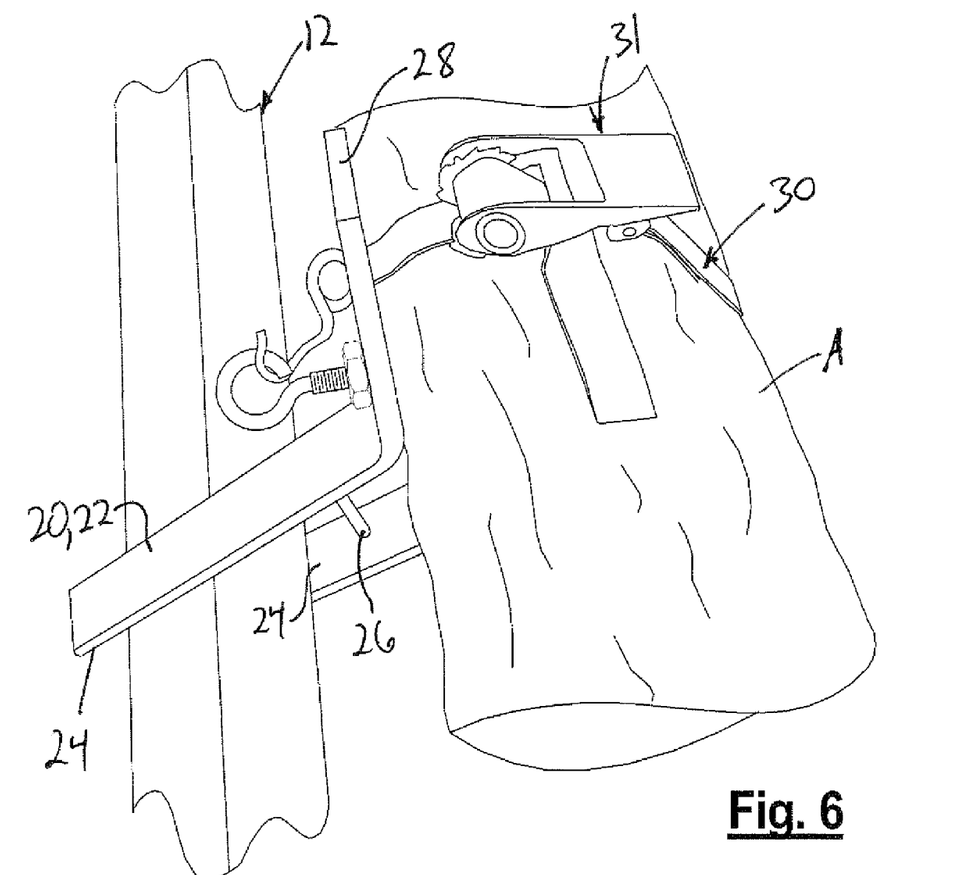
FIG. 6 is a perspective view of a brace of FIG. 1.

The pole 12 is a wooden 4-inch by 4-inch (4×4) board or two 2-inch by 4-inch (2×4) boards nailed together to form a 4×4. In alternative embodiments, the pole has a different cross-section, a different size, or both. Further, the pole 12 may be alternatively made of metal, such as aluminum. The pole 12 is about 16-feet long in the current embodiment, though other lengths may be used. A lower brace 20 and an upper brace 22 are affixed to the pole 12 by placing the pole between a pair of prongs 24 and tightening a pair of cross members 26 to squeeze the pole 12 between the prongs 24. Alternatively, the braces 20,22 are affixed to the pole 12 by fasteners such as bolts or wood screws. The pole 12 is vertically aligned with a tree A, or another sturdy, grounded object, and the braces 20,22 each have a pair of abutting arms 28 that form a wedge to engage the tree A. A strap 30 (FIG. 6) is affixed to each pair of abutting arms 28 and wraps around the tree A to secure the braces 20,22 against the tree A. The strip 30 is tightened using the ratchet 31. When using the pump jack tree stand 10 on private land, the user may wish to secure the braces 20,22 to the tree with screws or other fasteners.

A pump jack concept and design is described in U.S. Pat. No. 5,259,478 to Berish, et al., which patent is herein incorporated by reference. Alternative pump jack designs may also be used in conjunction with the invention. The pump jack 14 of the present invention, best shown in FIGS. 2A and 2B, includes a frame 32 that straddles the pole 12, an upper guide roller 34, a lower guide roller 35, a lower shackle assembly 36, and an upper shackle assembly 38 with a foot pedal pump arm 40. The frame 32 comprises two frame members held together by several tie bolts 42 which extend through spacer sleeves that establish the spaced relationship between the frame members. The upper guide roller 34 is coupled to the frame 32 by a pair of brackets 44 that are welded or fastened to the frame 32. The guide rollers 34,35 each comprise a rod extending through a roller sleeve 46 that is rotatable about the rod. The upper guide roller 34 engages the tree side of the pole 12, and the lower guide roller 35 engages the opposite side of the pole 12.

The lower shackle assembly 36 comprises a U-shaped support member 48 which comprises a pair of side arms and a rear connecting arm 49. The side aims have aligned holes at their rear ends sized to make a close rotatable fit with the guide roller 35. Another pivot shaft 52 is attached to and extends between the side arms of the member 48. The lower shackle assembly 36 also includes a U-shaped shackle yoke 54 that is rotatably mounted on pivot shaft 52. A torsion spring 56 is coiled about pivot shaft 52, with a center section of the spring extending outwardly of shaft 52 so as to overlap and engage connecting arm 49 of the U-shaped support member. The opposite ends of spring 56 overlap the lower shackle yoke 54. As a consequence, spring 56 biases the yoke of the lower shackle against pivotal movement in a clockwise direction (clockwise as viewed in FIG. 2A). The ends of the yoke 54 have keyed openings in the form of rectangular holes sized so as to accommodate and make a close sliding but not rotatable fit with the rectangular front clamping bar 58 of the lower shackle assembly 36.

Figure 2A:
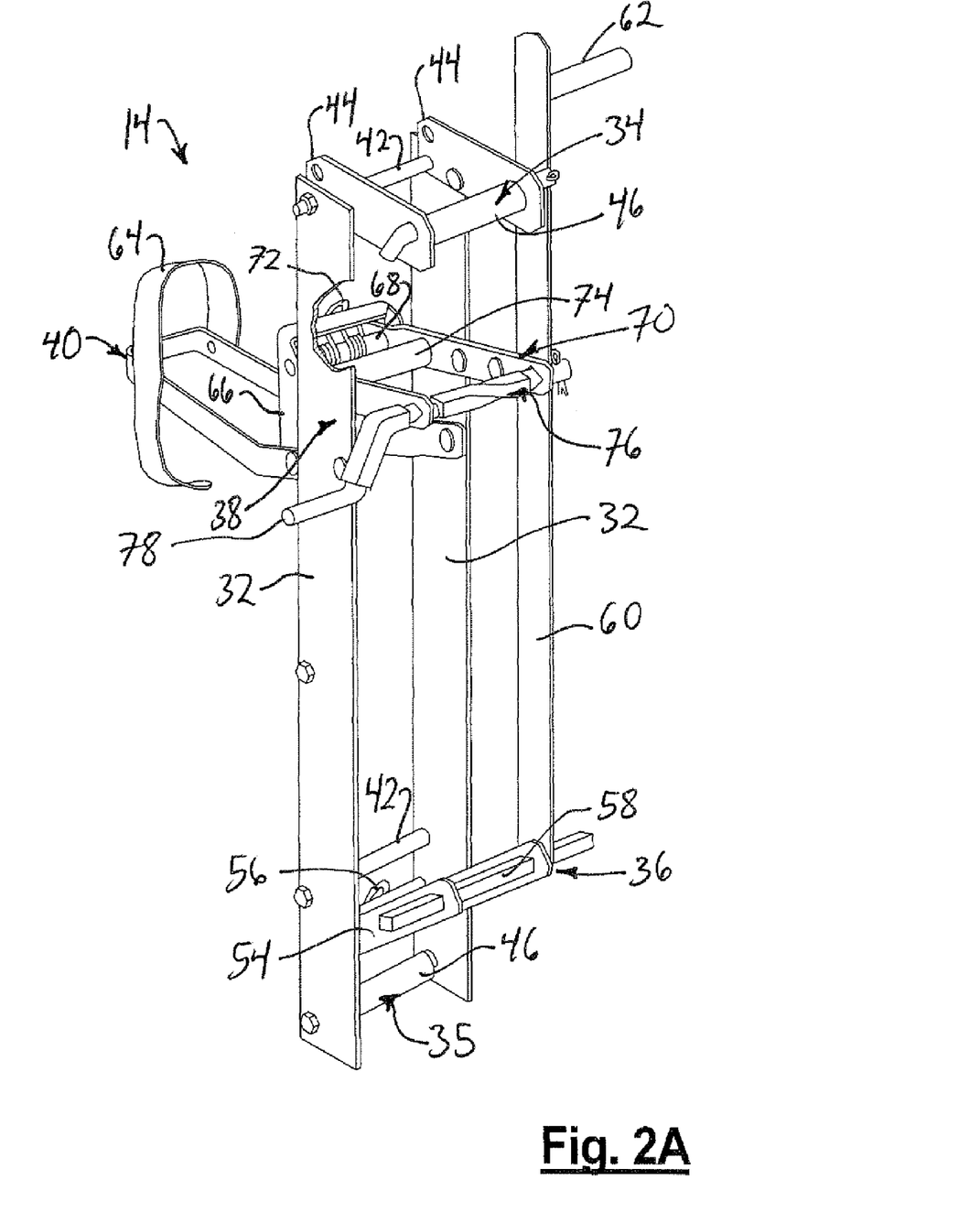
FIG. 2A is an isometric view of the pump jack of FIG. 1.
Figure 2B:
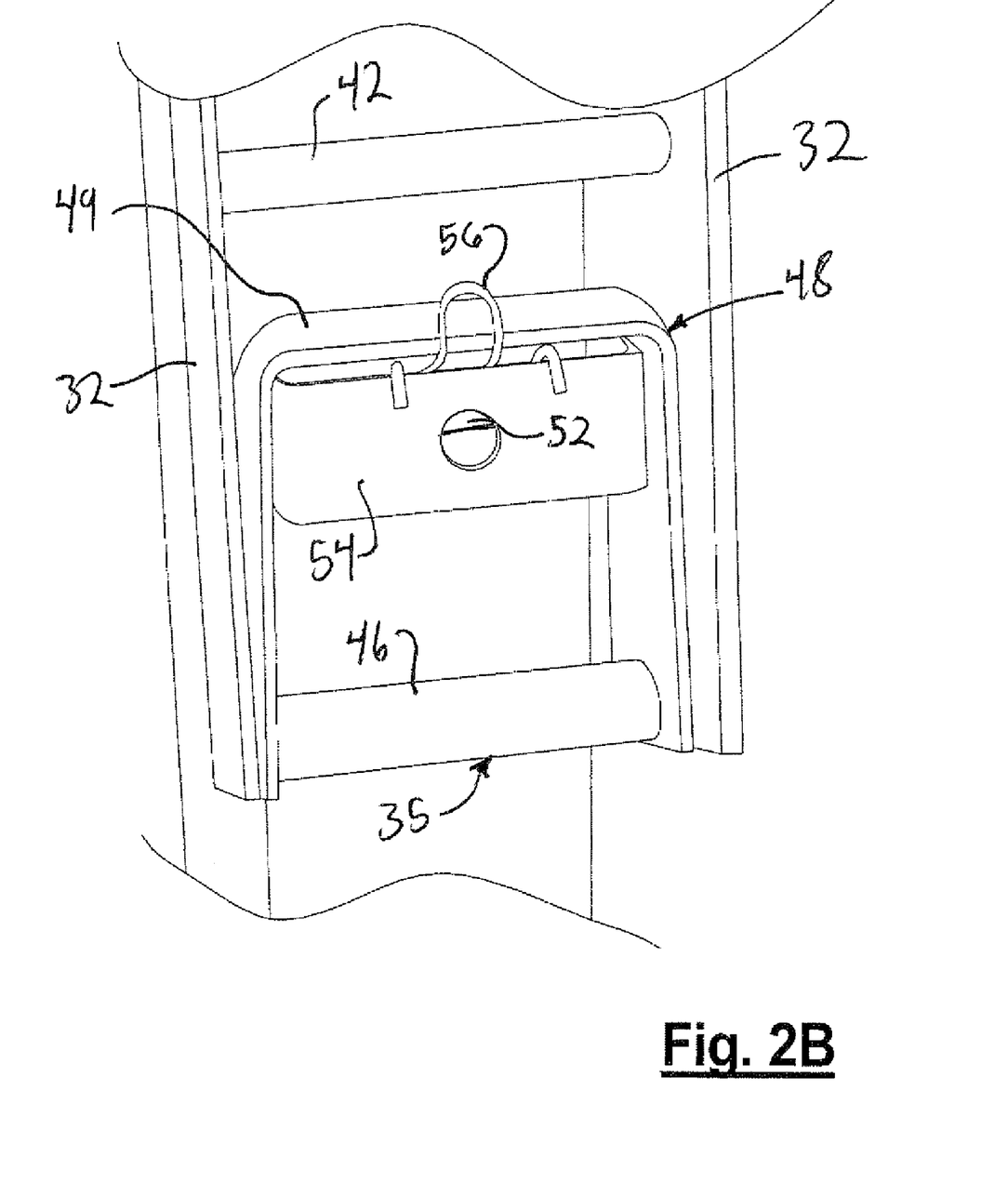
FIG. 2B is an elevation view of the lower shackle assembly of the pump jack of FIG. 2A.

The release mechanism includes a vertical release bar 60 and a release handle 62. The release bar 60 is affixed to the front clamping bar 58 of the lower shackle assembly 36, and slidably engages the brace 44. The release handle 62 is affixed near the top of the release bar 60 and extends away from the frame 32 so that a user may use a hand to push down on the handle to release the lower shackle 36.

The substantially U-shaped pump arm 40 is pivotally connected to the frame 32 by pivot rivets. The pump arm 40 comprises a pair of side struts and a connecting end strut. A strap 64 is connected at the proximal end of the pump arm 40; the strap 64 may be adjusted to fit different foot sizes.

The upper shackle assembly 38 is connected to the pump arm 40, and comprises a U-shaped support member 66 that is substantially identical to the U-shaped support member 48 of the lower shackle assembly 36. The side arms of the support member 66 have aligned holes at their rear ends sized to make a close rotatable fit with a cylindrical pivot rod 67 that is mounted to and extends between the side struts of the pump arm 40. Another pivot shaft 68 is attached to and extends between the side arms of the support member 66. A U-shaped shackle yoke 70 is pivotally mounted on pivot shaft 68. Pivot shaft 68 extends through aligned holes in the side struts of the shackle yoke 70 that are sized so as to make a close rotatable fit with the pivot shaft 68. A torsion spring 72 is coiled about pivot shaft 68, with a center spring section extending outwardly of the pivot shaft 68 so as to overlap and engage the connecting arm of the U-shaped support member 66. The two opposite ends of the spring 72 overlap the connecting strut of the shackle yoke 70. As a consequence, the spring 72 biases the yoke 70 against pivotal movement in a clockwise direction as viewed in FIG. 2A.

Adjacent pivot shaft 68 the upper shackle 38 is provided with a rear pole-gripping means in the form of a rod 74 with a rotatable cylindrical sleeve. Alternatively, the rod 74 and sleeve are replaced by a flat angled plate. At the forward end of the upper shackle yoke 70 is crank rod 76. The front of the side struts of the yoke 70 are formed with aligned rectangular holes. The Crank rod 76 comprises a helical center portion having a rectangular cross-section, an end section of circular cross-section, an intermediate section of circular cross-section, and a crank section having a rectangular cross-section at least where it joins circular intermediate section. A cotter pin inserted in a hole in the end section releasably prevents removal of the crank rod 76 from the yoke 70. An extended crank handle 78 is attached to the crank rod 76 for easier manual cranking of the crank rod 76. The handle 78 includes a rotatable cylindrical sleeve. The circular end section and the circular intermediate section each have an axial length sufficient to permit the crank rod 76 to be moved axially relative to the yoke 70 from a first rotatable position wherein circular sections are aligned with the struts of the yoke 70 and a second locked position wherein the end of the rectangular cross-section helical center portion of the crank rod 76 is disposed in registration with the rectangular hole in the yoke 70, whereby the crank can not be rotated. The crank rod 76 is normally in its second locked position.

Figure 3:
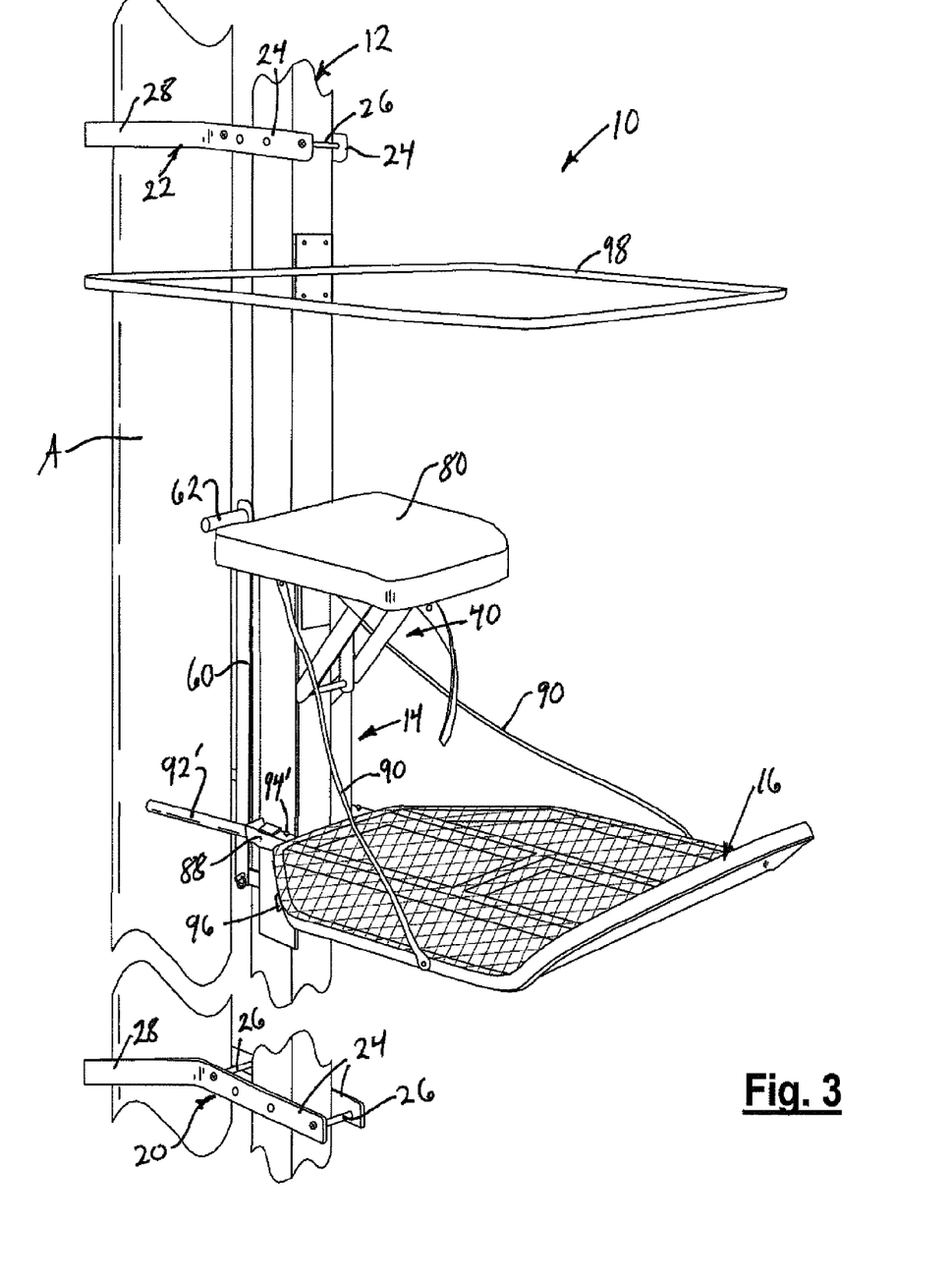
FIG. 3 is a perspective view of the pump jack tree stand of FIG. 1 with alternate stabilizer arms.

As shown in FIGS. 1 and 3, a seat 80 is pivotally attached to the top of the frame 32 via a hinge so that the seat 80 has a vertical position shown in FIG. 1 and a horizontal position shown in FIG. 3. In the vertical position, the seat allows the user to stand on the platform 16 and actuate the pump arm 40 with his foot to climb the pole 12 with the pump jack 14. A seat bracket 82 engages the pump arm 40 when the seat 80 is in the horizontal position and the pump arm 40 is in its highest position. This provides a sturdy seat for the user and prevents accidental actuation of the pump arm 40.

Figure 4A:
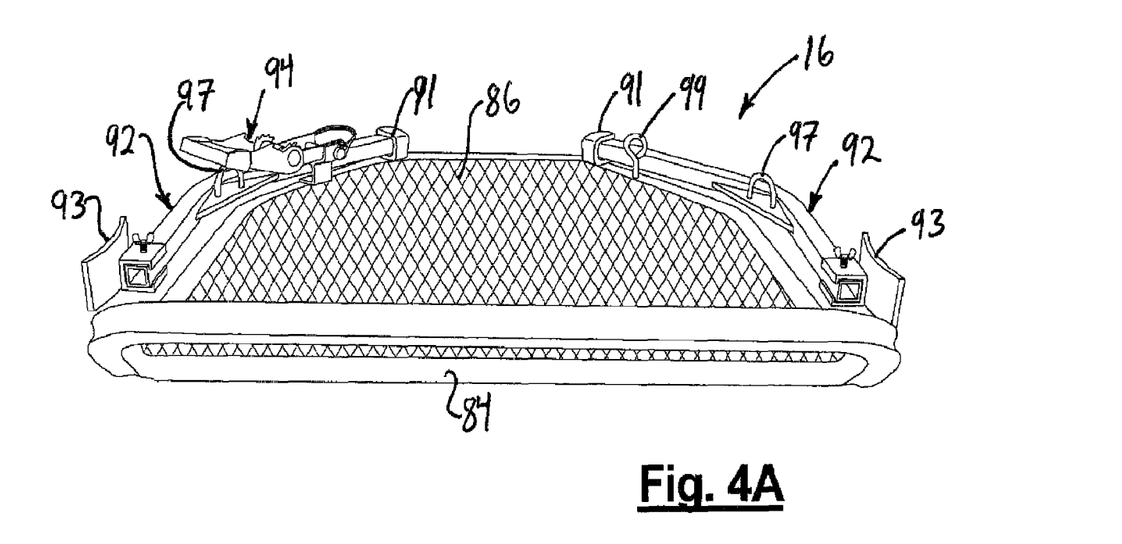
FIG. 4A is a front view of the platform of FIG. 1.
Figure 4B:
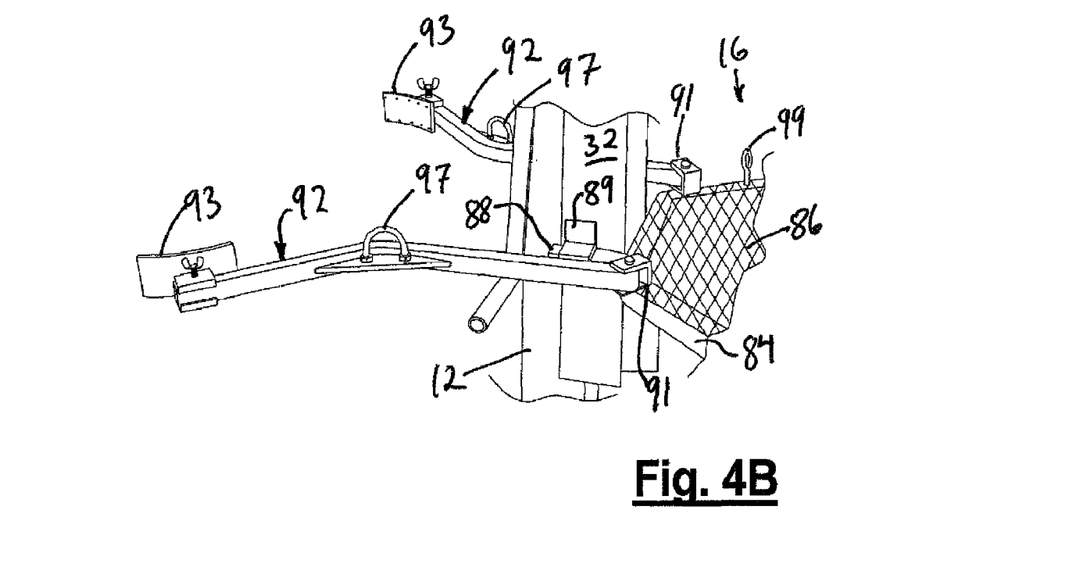
FIG. 4B is a view of the stabilizer arms of FIG. 1.

The platform 16 includes a frame 84, a web 86, and a pair of support arms 88. The support arms 88 engage brackets 89 on either side of the frame 32 of the pump jack 14. flexible cords 90 (such as steel cables) provide further support for the platform 16. The platform 16 also includes two stabilizer arms 92, which are best shown in FIGS. 1, 4A, and 4B. The stabilizer arms 92 are pivotally attached to the frame 84 at one end by brackets 91 and engage a tree at the opposite end with studded grips 93. The stabilizer arms 92 are secured to the tree by a ratchet strap 95 that engages the ratchet 94, passes through a loop 97 in each of the arms, and terminated at the strap hook 99. The ratchet tightens the strap 95 to force the stabilizer arms 92 toward each other thereby forcing the studded grips 93 against the tree A. For storage and transport, the stabilizer arms 92 may pivot about the brackets 91 to rest against the frame 84. Clasps or similar means (not shown) may be used to releasably secure the stabilizer arms to the frame 84. An alternative pair of stabilizer arms 92', best shown in FIG. 3, are slidable within the support arms 88 so that the user may extend the stabilizer arms 92' to abut the tree. A thumb screw 94' on each support arm 88 may be tightened by the user to retain the position of the stabilizer arms 92'.

Figure 5:
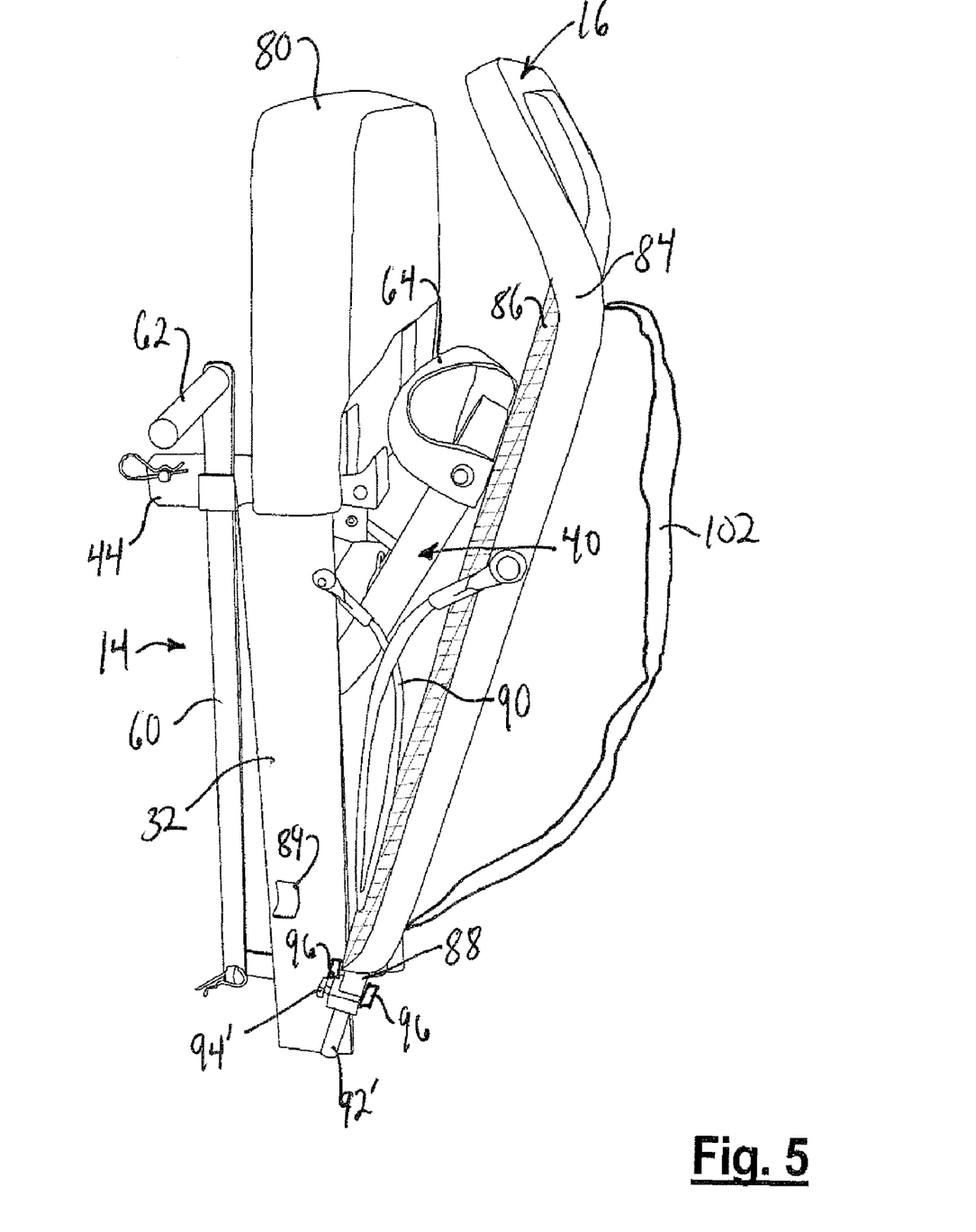
FIG. 5 is a side view of a the pump jack tree stand of FIG. 1 in a storage configuration.

The platform 16 may be reconfigured into a vertical position, as shown in FIG. 5, for easy carrying and storage of the pump jack tree stand 10. FIG. 5 illustrates the vertical position with the alternative stabilizer arms 92'; however, either of the stabilizer arms 92, 92' may be used. The stabilizer arms 92 are moved into the position shown in FIG. 4A before reconfiguring the platform 16 into the vertical position. The platform 16 is reconfigured by disengaging the support arms 88 from the brackets 89 and inserting the support arms 88 in between brackets 96 while the stabilizer arms 92' are in the retracted position. In an alternative embodiment, the platform is pivotally connected to the frame 32 to allow reconfiguring of the platform into the vertical and horizontal positions.

An optional gun rest 98 shown in FIGS. 1 and 3 is fastened to or otherwise installed onto the pole 12 above the pump jack 14 when in the user's preferred hunting position. The gun rest provides a railing to prevent the user from falling as well as allowing the user to stabilize a rifle while aiming at prey. A reinforcing arm may be situated between the front of the gun rest 98 and the front of the frame 84 as shown in FIG. 1 to provide support for the gun rest 98.

A pair of shoulder straps 102, shown in FIG. 5, are used for carrying the pump jack tree stand 10 to and from the site. The padded shoulder straps 102 are affixed to the frame 84 of the platform 16.

In use, the user carries the pole 12, the pump jack tree stand 10, and the braces 20,22 to a suitable site with a tall, substantially straight, sturdy tree. The pole 12 is assembled into a 4×4 configuration if needed and the braces 20,22 are affixed to the pole 12 at opposing ends. The pole 12 is aligned with the tree with the abutting arms 28 of the braces 20,22 against the tree. The strap 30 is attached to the abutting arms 28 of the lower brace 20, wrapped around the tree, and tightened with a ratchet device. The strap 30 and the abutting arm 28 of the lower brace 20, along with the abutting arms 28 of the upper brace 22 provide enough support for the pole 12 and the pump jack tree stand 10 until the upper strap may be affixed to the upper brace 22. The pump jack 14 is assembled onto the pole 12 by first removing the upper guide roller 34, the crank rod 76, and the clamping bar 58. The frame 32 then slides over the pole 12 and the upper guide roller 34, the crank rod 76, and the clamping bar 58 are replaced. The platform 16 is configured from the vertical position to the horizontal position and the seat 80 is placed in the upright position to give the user access to the pump arm 40. The tree stand is now ready to climb the pole 12.

The user moves crank rod 76 axially to its locked position wherein the rectangular cross-section end of its helical center portion is in registration with rectangular hole in the side strut of the yoke 70, whereupon the crank rod 76 is locked against rotation. Thereafter, if the pump arm 40 is moved up and down by the user's foot, the jack will move up on the pole 12 stepwise, one upward step for each downward step of the pump arm 40. When the pump arm 40 is moved downward, crank rod 76 will grip the pole 12 so that downward movement of the pump arm 40 will cause the jack 14 to move up.

When this occurs, the lower shackle assembly 36 will automatically release the pole 12 to permit upward movement of the jack 14. When the pump arm 40 is moved upwardly, the lower shackle 36 will grip the pole 12 to prevent the jack 14 from falling down. Upward movement of the pump arm 40 releases the crank rod 76 from the pole 12 and allows it to move up to a new pole-gripping position.

Once the pump jack 14 and platform 16 are high enough that the user may reach the upper brace 22, the user attaches the strap 30 to the abutting arms 28 of the upper brace 22 and the strap 30 is cinched around the tree. The optional gun rest 98 is affixed to the pole 12 at this point. The user then releases the stabilizer arms 92 from the frame 84 and swings the arms around until the studded grips 93 engage either side of the tree A. The ratchet strap 95 is attached to the strap hook 99 and passed through the loops 97 to the ratchet 94. The user actuates that ratchet 94 to tighten the strap 95 against the loops 97 to force the studded grips 93 against the tree A. Alternatively, the user loosens the thumb screws 94' and extends the stabilizer arms 92' to abut the tree on either side of the pole 12. The user then tightens the thumb screws 94' to secure the stabilizer arms 92'.

Lowering of the jack 14 requires moving crank rod 76 axially to its first rotatable position. This is accomplished by first pulling the crank rod 76 toward the handle of the crank rod 76 far enough so that its helical center portion is removed from hole in yoke 70 and its round sections are in registration with the holes, thereby freeing the crank rod 76 so that it can be rotated by manual manipulation of its crank handle. At this point the pole 12 is gripped by the front and rear clamp means of the lower shackle 36. Then the user presses down on the handle 62 of the release bar 60 to cause the front clamp rod 58 of the lower shackle assembly 36 to release or reduce its grip on the pole 12. Then, while the release bar 60 is still being depressed, the user grasps the extended crank handle 78 and rotates it clockwise (as viewed in FIG. 2A) to cause the jack 14 to track down on the pole 12. The releasing action of the release bar 60 is opposed by the torsion spring 56 which tends to return the lower shackle 36 to a pole-gripping position. Consequently, upon release of release bar 60, torsion spring 56 will bias the lower shackle 36 back into clamping relation with pole 12, whereupon the jack 14 will again be secured to the pole 12 by the lower shackle assembly 36. Thereafter, the user may again move the crank rod 76 into the locked position.

It should be particularly noted that conventional pump jacks require the user to use a foot to release the lower shackle assembly 36, which reduces the user's stability on the platform. The use of the hand operated release bar 60 in lieu of the conventional foot-actuated release allows the user to keep both feet on the platform 16 while lowering the tree stand in a more natural position.

The pump jack tree stand 10 is removed from the pole 12 by returning the platform 16 to the vertical position and removing the upper guide roller 34, the crank rod 76, and the clamping bar 58. The user then slides the frame 32 off of the pole 12, replaces the upper guide roller 34, the crank rod 76, and the clamping bar 58. The user may then carry the tree stand 10 away from the site for storage using the shoulder straps. The pole 12 is left behind, mounted to the tree, though little is left behind that may be easily damaged by weather and vandalism, and what is left behind is not valuable if it is damaged or stolen. When returning to the site for additional hunting, the user only needs to reconnect the pump jack 14 to the already-installed pole 12 and use the pump jack 14 to climb the pole 12 to the desired position.

While ascending and descending the pole 12 on the pump jack tree stand 10, the user may use a safety harness to reduce the risk of falling. A harness, such as a full body harness that is worn over the shoulders, thighs, and buttocks, may be worn by the user and engage a fall protection lanyard. The lanyard engages a lifeline rope via a rope grab that allows the lifeline to pass through the rope grab at low speeds, but a cam in the rope grab locks onto the lifeline in the event of a fall. The lifeline is affixed to an anchor point on the tree near the top of the pole 12. Alternative belay systems and safety equipment may also be used with the invention.

Figure 7:
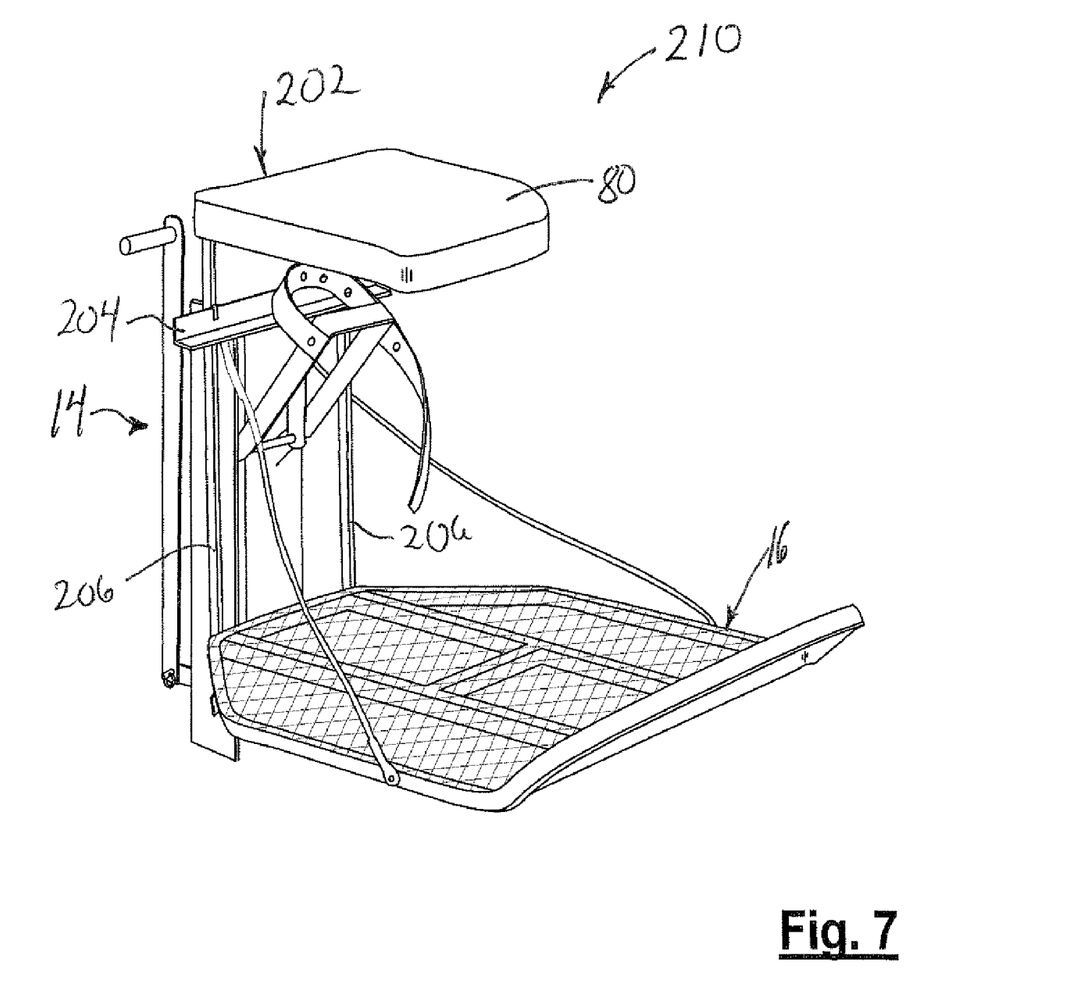
FIG. 7 is a view of an alternative embodiment of the pump jack tree stand.

In an alternative embodiment shown in FIG. 7, the pump jack tree stand 210 includes the braces 20,22, the pump jack 14, a commercially available tree stand 202, and a universal bracket 204. The tree stand 202 is a hanging tree stand that includes the platform 16, the seat 80, and two legs 206 extending upward from the platform 16 to support the seat 80. The universal bracket 204 is affixed to the top of the pump jack 14 by welding, riveting, or another suitable affixing means. The user assembles the tree stand 202 to the universal bracket 204 by fastening the legs 206 to the universal bracket 204.

In a further alternative embodiment, the invention includes a stabilizer strap that is wrapped around the tree directly below a branch a short distance below the desired height of the tree stand. The user actuates the pump jack 14 to climb the pole 12 to the level of the branch and then fastens the stabilizer strap to either side of the frame 32. The user then actuates the pump jack 14 to raise the tree stand the remaining distance to the desired height. The branch prevents the stabilizer strap from ascending with the pump jack, thus a tension with a horizontal component is created in the stabilizer strap. The horizontal component forces the braces 20,22 against the tree thereby stabilizing the pole 12.

While the invention has been described with reference to preferred embodiments, it will be understood by those skilled in the art that various changes may be made and equivalents may be substituted for elements thereof to adapt to particular situations without departing from the scope of the invention. For example, pump jacks are well known in the roofing and siding industry and other designs of pump jacks may be incorporated into the invention. Likewise, other tree stand platforms may be combined with such pump jacks to achieve substantially the same results as those achieved with the above-described embodiment. Therefore, it is intended that the invention not be limited to the particular embodiments disclosed as the best mode contemplated for carrying out this invention, but that the invention will include all embodiments falling within the scope and spirit of the appended claims.

The invention claimed is:

1. A pump jack tree stand, comprising:
a portable vertical support configured for engaging a grounded object;
a single pump jack comprising a frame,
an upper and a lower shackle respectively coupled to the frame and biased against the vertical support;
a foot pedal pump arm attached to one of the shackles and operable with reciprocating motion to move one shackle vertically when the foot pedal pump arm is operated in a first direction and to move the other shackle in the vertical direction when the foot pedal pump arm is moved in the opposite direction;
a platform directly connected to one or more support arms that are directly connected to the frame, the pump jack capable of traveling with the platform up and down the portable vertical support; and
the one or more support arms disposed between the platform and the pump jack for entirely supporting the platform;
a seat directly and rotationally connected to the frame and operable to rotate to a first, vertical position while the pump jack travels on the portable vertical support, and the seat is operable to rotate to a second, horizontal position when the pump jack is at a desired location on the portable vertical support; the seat positioned in the second horizontal position is a sitting position, wherein the seat engages the pump arm and the seat in the first vertical position is a climbing position wherein the seat is pivoted to a substantially vertical position to allow access to the pump arm.

2. The pump jack tree stand of claim 1, the pump jack having the lower shackle as part of a lower shackle assembly that is biased against the portable vertical support to prevent the pump jack from translating downward; the lower shackle assembly having a hand-actuated release.

3. The pump jack tree stand of claim 1, the platform being configurable to engage the pump jack in a substantially horizontal use position and a substantially vertical storage and transport position.

4. The pump jack tree stand of claim 3, further comprising a shoulder strap to aid in carrying the pump jack tree stand when the platform is in the substantially vertical storage and transport position.

5. The pump jack tree stand of claim 1, the grounded object comprising a tree and the portable vertical support comprising a pole having a brace proximate to each end of the pole; the braces being configured for engaging the tree.

6. The pump jack tree stand of claim 5, the braces each comprising a strap for holding the brace against the tree.

7. The pump jack tree stand of claim 1, the portable vertical support being a 4-inch by 4-inch board.

8. The pump jack tree stand of claim 1, further comprising a gun rest directly affixed to the vertical support and a reinforcing arm supporting the gun rest against the platform.

9. A pump jack tree stand, comprising:
a portable vertical support configured for engaging a grounded object;
a single pump jack comprising a frame;
an upper and lower shackle respectively coupled to the frame and biased against the vertical support;
a foot pedal pump arm attached to one of the shackles and operable with reciprocating motion to move one shackle vertically when the foot pedal pump arm is operated in a first direction and to move the other shackle in the vertical direction when the foot pedal pump arm is moved in the opposite direction;
a platform directly connected to one or more support arms that are directly connected to the frame, the pump jack capable of traveling with the platform up and down the portable vertical support;
the one or more support arms disposed between the platform and the pump jack for entirely supporting the platform; and
a pair of stabilizer arms, one end of each respective stabilizer arm is directly and pivotally attached to the platform and the other end of each respective stabilizer arm has a studded grip for engaging a tree; at the stabilizer arms further comprise means for forcing the studded grips of the stabilizer arms against a tree.

10. A pump jack tree stand, comprising:
a single pump jack comprising a frame for straddling a vertical support, an upper and lower shackle respectively coupled to the frame and biased against the vertical support;

a foot pedal pump arm attached to one of the shackles and operable with reciprocating motion to move one shackle vertically when the foot pedal pump arm is operated in a first direction and to move the other shackle in the vertical direction when the foot pedal pump arm is moved in the opposite direction; and a platform directly connected to one or more support arms that are directly connected to the frame, the pump jack capable of traveling with the platform, and the one or more support arms disposed between the platform and the pump jack for entirely supporting the platform;

a pair of stabilizer arms; one end of each respective stabilizer arm is directly and pivotally attached to the platform and at the other end of each respective stabilizer arm is a studded grip for engaging a tree, the stabilizer arms further comprise means for forcing the studded grips of the stabilizer arms against a tree.

11. The pump jack tree stand of claim 10, further comprising a seat directly and rotationally connected to the frame and operable to rotate to a first, vertical position while the pump jack travels on the portable vertical support, and the seat is operable to rotate to a second, horizontal position when the pump jack is at a desired location on the portable vertical support; wherein the seat is pivoted to a substantially vertical position to allow access to the pump arm when an operator moves the pump jack up or down a vertical support.

12. The pump jack tree stand of claim 10, the pump jack having the lower shackle as part of a lower shackle assembly that is biased against the portable vertical support to prevent the pump jack from translating downward; the lower shackle assembly having a hand-actuated release.

13. The pump jack tree stand of claim 10, the platform being rotationally directly connected to the frame for rotating to a substantially horizontal use position and a substantially vertical storage and transport position.

14. The pump jack tree stand of claim 13, further comprising a shoulder strap directly connected to the pump jack tree stand to aid in carrying the pump jack tree stand when the platform is in the substantially vertical storage and transport position.

15. The pump jack tree stand of claim 10, further comprising a gun rest directly affixed to the vertical support and a reinforcing arm supporting the gun rest against the platform.

16. The pump jack tree stand of claim 1, wherein two brackets respectively extend from opposite sides of the frame and the one or more support arms extend below the platform and respectively engage the brackets to support the platform.

17. The pump jack tree stand of claim 10, wherein two brackets are respectively extending from opposite sides of the frame and the one or more support arms are extending below the platform and respectively engaging the brackets to support the platform.

18. The pump jack tree stand of claim 1 wherein the platform extends laterally from the pump jack substantially equal lengths in opposite directions.

19. The pump jack tree stand of claim 1 wherein the platform extends laterally from the pump jack substantially equal lengths in opposite directions.

20. The pump jack tree stand of claim 1 wherein the platform has a substantially square surface.

21. The pump jack tree stand of claim 10 wherein the platform has a substantially square surface.

* * * * *